United States Patent
Winter et al.

(10) Patent No.: US 6,905,141 B2
(45) Date of Patent: Jun. 14, 2005

(54) GLASS ELEMENTS WITH A CONDUCTIVE COATING, THE USE THEREOF, AS WELL AS DEVICES, INSTALLATIONS AND PIPE CONDUCTS PRODUCED THEREFROM

(75) Inventors: Karl-Heinz Winter, Wiesbaden (DE); Klaus Gerth, Klein-Winternhelm (DE)

(73) Assignee: QVF Engineering GmbH, Mainz (DE)

( * ) Notice: Subject to any disclaimer, the term of this patent is extended or adjusted under 35 U.S.C. 154(b) by 0 days.

(21) Appl. No.: 10/276,769

(22) PCT Filed: May 14, 2001

(86) PCT No.: PCT/EP01/05465

§ 371 (c)(1),
(2), (4) Date: Jan. 10, 2003

(87) PCT Pub. No.: WO01/90011

PCT Pub. Date: Nov. 29, 2001

(65) Prior Publication Data

US 2004/0109961 A1 Jun. 10, 2004

(30) Foreign Application Priority Data

May 19, 2000 (DE) .......................... 100 24 738

(51) Int. Cl.[7] .................................. F16L 9/14
(52) U.S. Cl. .................. 285/55; 285/364; 285/368; 285/422; 285/423; 285/923
(58) Field of Search .................. 285/55, 422, 423, 285/923, 364, 368

(56) References Cited

U.S. PATENT DOCUMENTS 3,124,502 A * 3/1964 Radke .......................... 428/66.4
3,207,644 A * 9/1965 Hobson, Jr. et al. .......... 156/217
3,212,798 A * 10/1965 Lewis et al. .................. 285/230
3,372,949 A * 3/1968 Mclay .......................... 285/364
3,572,773 A * 3/1971 Read ............................ 285/236
3,679,237 A * 7/1972 De Angelis .................. 285/109
3,778,578 A * 12/1973 Long et al. .................. 219/687
3,977,709 A * 8/1976 Hatzis .......................... 285/368
4,142,744 A * 3/1979 Janssen Bennynck ....... 285/368
4,877,270 A * 10/1989 Phillips ........................ 285/18
4,913,472 A * 4/1990 Janakirama-Rao .......... 285/336
5,433,486 A * 7/1995 Mannl et al. ................ 285/114
5,810,399 A * 9/1998 Platano ........................ 285/38
5,909,904 A * 6/1999 Shea ............................ 285/405
5,977,241 A * 11/1999 Koloski et al. .............. 524/502
6,328,347 B1 * 12/2001 Reder et al. ................. 285/261
6,391,227 B1 * 5/2002 Yoon et al. .................. 252/500
6,515,417 B1 * 2/2003 Duggal et al. ............... 313/506
6,638,566 B1 * 10/2003 Lee .............................. 427/64

FOREIGN PATENT DOCUMENTS

| DE | 42 29 192 A1 | 3/1994 |
| EP | 0 339 340 A2 | 11/1998 |
| EP | 0 999 242 A | 5/2000 |
| WO | WO 98 25274 A | 6/1998 |

* cited by examiner

Primary Examiner—James M. Hewitt
(74) Attorney, Agent, or Firm—Henry M. Feiereisen; Ursula B. Day

(57) ABSTRACT

Glass modules for use in the assembly of equipment, installations and for pipe works, the surfaces of which are entirely or partially coated with a conductive coating, in particular from transparent conductive polymers for the purpose of reducing surface resistance, their use, as well as the equipment, installation and pipe works made therefrom.

11 Claims, 3 Drawing Sheets

US 6,905,141 B2

GLASS ELEMENTS WITH A CONDUCTIVE COATING, THE USE THEREOF, AS WELL AS DEVICES, INSTALLATIONS AND PIPE CONDUCTS PRODUCED THEREFROM

BACKGROUND OF THE INVENTION

The present invention refers to glass modules for the construction of equipment— and installations and pipe works, their use, as well as equipment, installations and pipe works assembled from these modules.

It is known to construct equipment, installations and pipe works, for example for the chemical industry, the pharmaceutical industry or the food industry from glass building modules. The glass building modules are assembled for each of the different purposes from suitable glass, in particular, from boron silicate glass. One of the foremost requirements of the glass building modules, respectively the equipment, installations and pipe works assembled therefrom, is the necessary chemical stability against the substances produced therefrom or that are transported at the intended work temperatures, as well as the necessary mechanical properties, in addition to which, the required stability at resulting temperatures and pressures and the integrity of the glass surface in the intended environment must be taken into consideration. In order to ensure protection of the glass surface of the glass building modules, for example those made from boron silicate glass against exterior damage, for example scratches or blows, it is customary in the equipment and installation construction field to protect the glass surface by means of coverings or coatings. A common protective cover is a transparent layer of a polyurethane basis, which is commercially known as Sectrans. Such Sectrans coverings are applied to the glass surface by spraying them onto the glass surface in defined layers. Permanent use temperature is 140° C., but short-term temperatures up to 180° C. are permissible. With a Sectrans coating not only is the glass surface protected against scratches and blows, but protection against splintering when indeed a glass break occurs, is also ensured. In an operation carried out without pressure, the Sectrans coating can also provide a certain protection against the leakage of a medium from broken glass equipment.

Another possibility to protect surfaces of glass modules and installations is provided when coating the glass modules with glass fiber mats, which are placed onto the glass module and which are subsequently soaked in polyester resin ("GFP-coating"). Such coatings are, in general, sufficiently transparent although they do not achieve the transparency of the above Sectrans coatings. The maximum operating temperature of GFP coated glass modules is 150° C.

The afore-described coverings and coatings, while improving the mechanical properties, are from materials that are electrically non-conductive having an electric surface resistance of typically above $10^{12}$ $\Omega$, as compared to uncoated glass they are however, electrostatically more chargeable. Uncoated glass normally forms at its surface a watery film and thereby normally has a significantly reduced electrical surface resistance, so that according to the guidelines "Statistical Electricity" No. ZH 1/200 of the BG-Chemie, normally no special protective measures against electrostatic charges are required. With glass surfaces which are in contact with the atmosphere, the specific electrical surface resistance remains at normal air humidity with maximal $10^6$ $\Omega$ in an uncritical range.

Local or extended electrostatic charges of non-conductive, i.e. modules and pipe works and installations constructed therefrom and not coated with conductive layers, can effect spark or brushing discharges during certain chemical processes leading to ignition of the material mixture. The afore-described glass modules and installations with coatings or polyurethane layers must therefore be secured against improper electrostatic charges when utilizing ignitable material mixtures.

Likewise, installations made from untreated glass, under certain circumstances can become potentially dangerous to charging, namely when the glass surfaces are not in contact with moist ambient air, but with non-aqueous and/or water binding media, such as for example benzol or toluol, in that they lack the protective and conductive watery film.

SUMMARY OF THE INVENTION

It is an object of the present invention to provide the security of glass modules and equipment, installations and pipe works built therefrom in view of their capacity for electrostatic charges, without having to provide the requisite additional protective measures used heretofore.

Most essential element of the glass modules of the present invention is that their surfaces are coated entirely or partially with an outer coating in order to reduce the surface resistance.

"Surfaces" means without limitations all types of surfaces of the glass modules and comprises outer surfaces that are in contact with the ambient air, as well as also, for example surfaces that are interior surfaces in installations or pipe works. When these surfaces are covered "entirely or partially" with a coating for reduction of the surface resistance, in this context it means also, that only their interior or exterior surfaces may be coated and/or that the surface coatings may not be complete coatings, but may also be, for example, in the form of printed line networks or, they can be provided only to portions of an installation that are at risk of being charged.

It is understood that when coatings are applied to the interior surfaces, the necessary chemical stability against the respective medium must be realized. Otherwise, there are no special features with respect to the use of interior coatings, so that the following description of embodiments of the invention is in connection with glass modules respectively equipment, installations and pipe works where the coating is applied to the outer surface.

The applied coatings should lower the surface resistance of the respective glass modules to at least that of the normal specific electrical surface resistance of uncoated glass, that is, to an order of magnitude of $10^8$ $\Omega$ or less. Preferably, a coating material is used, which does not, or does not substantially interfere With the transparency of the coated glass.

The afore-described requirements can be realized with coatings from transparent conductive organic polymers. Such coatings from conductive organic polymers can be prepared in various ways. For example through spreading or, preferably through spraying. For application of the coating, the suitable conductive polymers are provided dissolved in a solvent or they are dispersed in a liquid carrier.

A particularly suitable and presently preferred conductive polymer is a polyethylendioxythiophen/polystyrolsulfonate (PEDT/PSS)-polymer which is marketed under the commercial named Baytron P available from Bayer AG and offered for coating of glass and plastics. It results in conductive, transparent and nearly colorless coatings. It is presently preferably utilized for coating of plastic foils or cathode ray tubes. The application of a watery dispersion containing the described polymers, can also be realized through spin-coating, pressure processes and roller application techniques, aside from application by spraying or spreading. For improving the adhesion, the coatings can contain adhesion improving supplements, for example those that can be seen from the product information of Bayer AG for the product Baytron P.

A coating with the conductive PEDT/PSS polymer can be utilized for glass modules to a maximum temperature of 140° C.

Other conductive polymers, which are contemplated instead of the heretofore described PDT/PPS polymers, are for example polyaniline or polypyrrole, which however produce worse results with regard to the transparency of the formed coatings.

When assembling installations, equipment and pipe works from the glass modules with the conductive coatings according to the invention, it is preferred that an electrical bridging is made at the point of juncture of each glass module. Thereby, it is ensured that the surface area of the glass building modules that have been rendered conductive extend essentially across the entire area of the equipment, installation or pipe works.

BRIEF DESCRIPTION OF THE DRAWINGS

Following, the invention is further described in detail with respect to five figures.

It is shown in.

DETAILED DESCRIPTION OF PREFERRED EMBODIMENTS

Figure 1:
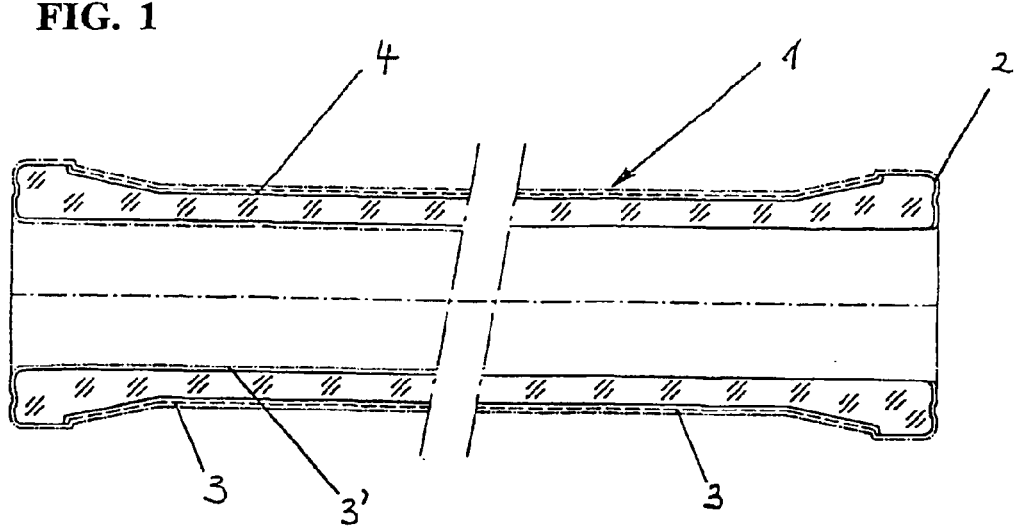
FIG. 1 a schematic representation of a glass module with two safety flat buttress ends and coatings.

FIG. 1 shows in schematic representation a glass building module in the form of a glass pipe which, is provided with a safety flat buttress at its ends, which is shown as an example of one of the flange forms known in the instant subject area. Other known flange forms are for example crimping flanges, ground joints, ball and socket joints and others. The glass module shows a first protective coating 4 from a non-conductive coating material, for example polyurethane (Sectrans), which in accordance with the invention is coated with a further coating 3, for example from PEDT/PSS. Furthermore, in this Figure there is shown a conductive coating referenced as 3', which is applied, to the interior side of the glass module. When applying the conductive coating, it is preferably arranged so that through spraying, a defined and suitable layer with a thickness of for example of 3 to 5 $\mu$m, preferably about 6 $\mu$m is attained. Such a coating results in the transparency of the glass remaining intact.

As shown here, the electrically conductive coating 3 is applied over the surface of the glass module, which has been applied to the entire pre-coated surface. Between the flange ends the coating is continuous thereby realizing a bridging of the flange ends, for example in a manner as further elaborated in connection with FIGS. 2 to 5.

By applying the coating to the glass building module, the surface resistance of a pre-coated glass building module can be lowered to an order of magnitude of $10^7$ $\Omega$. In the following Table 1, this value is compared to the completely uncoated glass and glass coated only with a protective layer.

|  | Surface resistance [$\Omega$] |
| --- | --- |
| Glass uncoated, T = 20° C. Normal air humidity | $10^8$ $\Omega$ |
| Glass coated | $10^{13}$ $\Omega$ |
| Glass coated + conductive coating | $10^7$ $\Omega$ |

When assembling glass modules for equipment, installations or pipe works, known connection elements such as flange rings with pressure springs, screws and seals are utilized. FIGS. 2 to 5 show how conductive junctures can be realized when using such modules.

Figure 2:
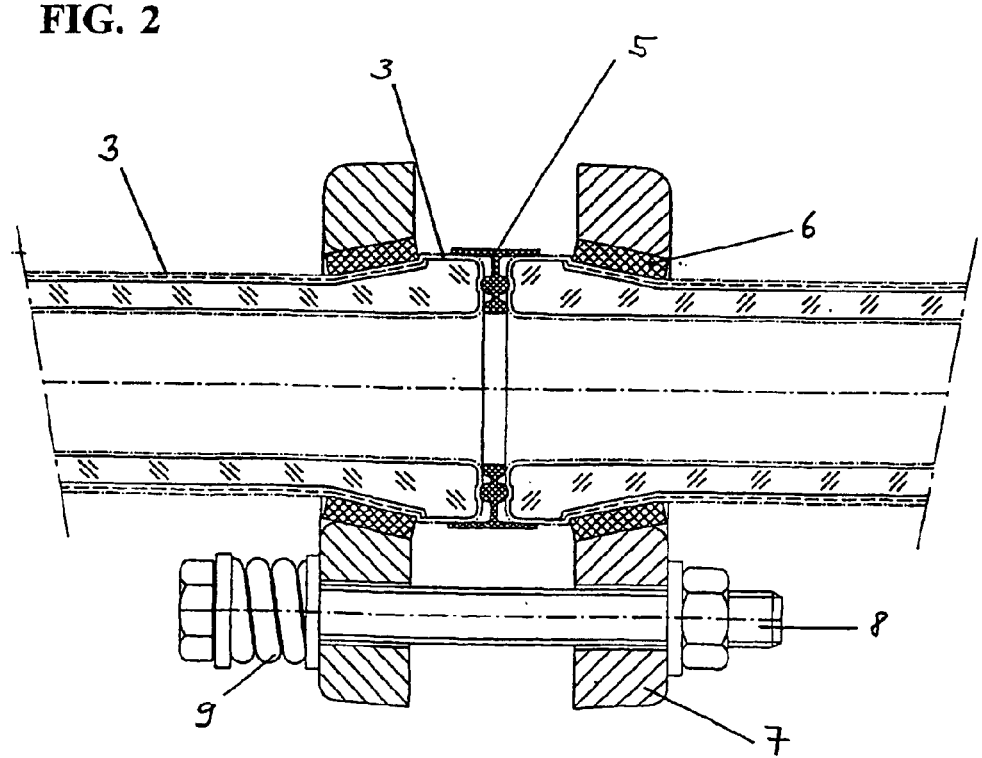
FIG. 2 an embodiment of an electrical conductive juncture of two glass modules with the safety flat buttress ends according to FIG. 1 utilizing a special seal.
Figure 3:
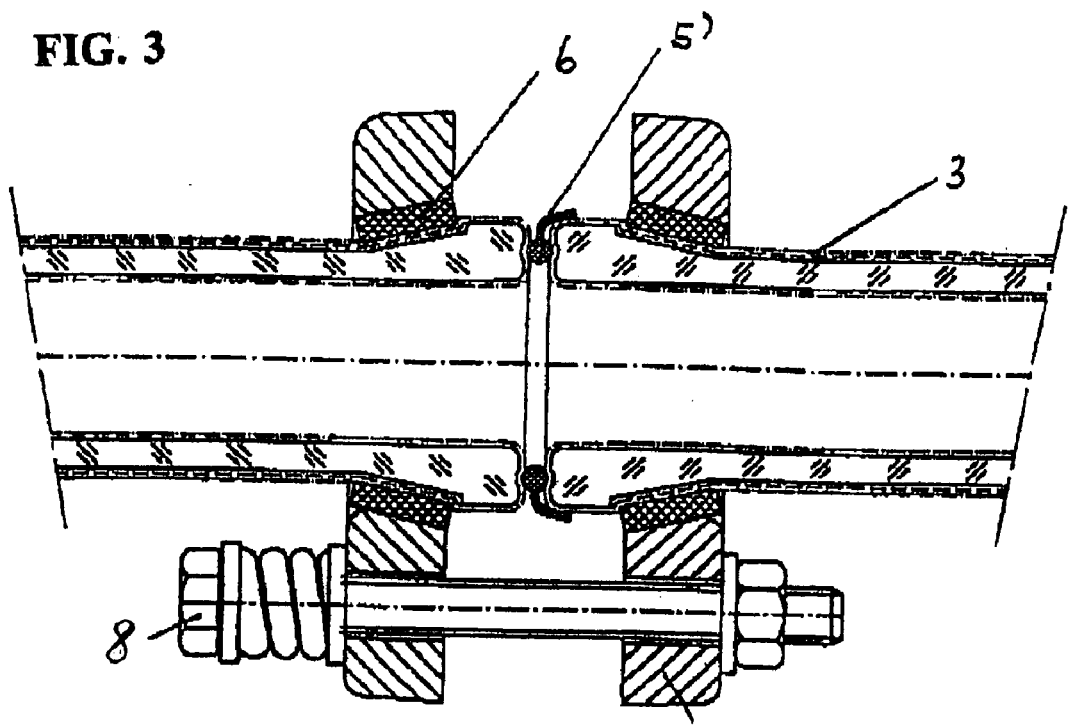
FIG. 3 a modified embodiment of a juncture in accordance with FIG. 2.
Figure 4:
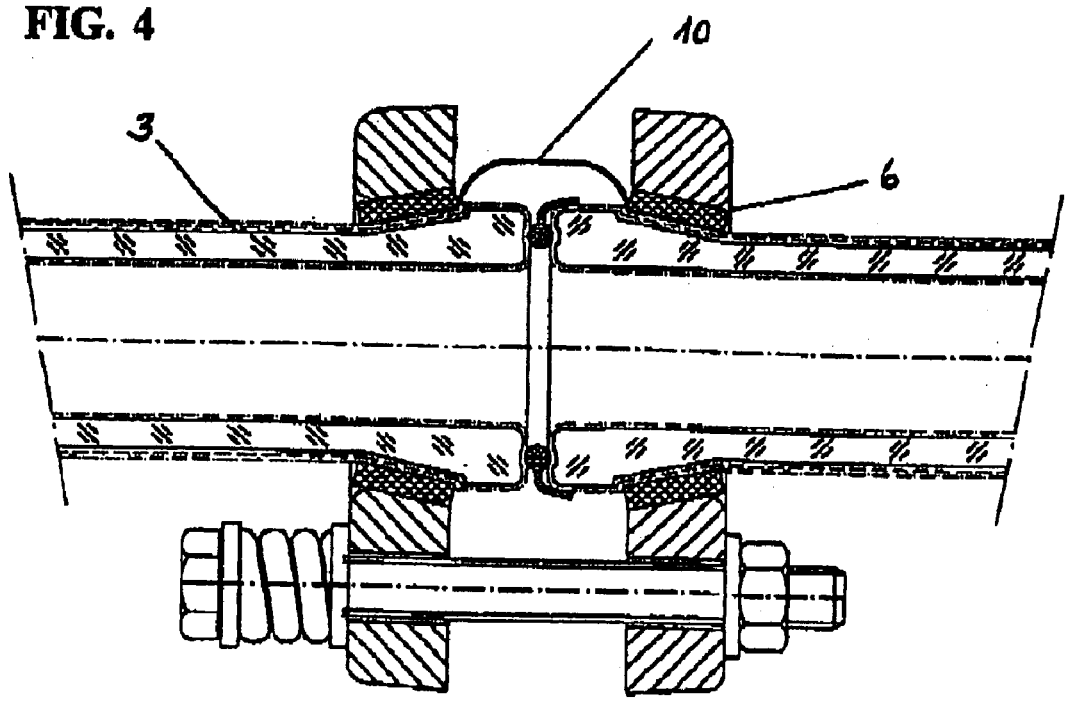
FIG. 4 a further modified embodiment of a conductive juncture according to FIG. 2.

With respect to the FIGS. 2 to 4, a conductive juncture between two glass modules with the flat buttress end is at least partially realized by utilizing a seal 5 respectively 5', which consists of an electrostatically conductive material, for example PTFE-graphite. For improvement of the contacts of seal 5 with the conductively coated surface of the glass module, according to FIG. 2, seal 5 is configured in a special way. Its outer collar is so dimensioned that it is firmly supported on the conductive coating 3 of the two glass modules. A further electrical contact is provided by means of the seal surface itself, wherein the two glass surfaces are pressed against each other by means of the force exerted from pressure spring 9.

In order to improve the conductivity of the established juncture, in embodiments of FIGS. 2 to 4, the metallic flange ring 7 exhibits an electrical conductive intermediate layer 6. Thereby, the two glass modules are conductively joint to one another, once—through the seal 5 respectively 5', and additionally through the flange rings which are coupled with a metal screw 8 and its conductive lead with the intermediate layer 6. The intermediate layers are being pressed by means of the spring force onto the conductive coatings 3, thereby realizing the contact. The reaction force is transmitted via the intermediate layers 6 into the flange rings 7, and by means of the screw connection with a conductive metal screw 8, a bridge is formed to the opposite situated flange ring 7.

FIG. 4 shows a further variant, wherein in addition to the elements shown in FIG. 3, for further bridging, an electrically conducting band 10 is provided which extends across the safety flat buttress end and which is disposed at both ends underneath the intermediate layers 6 of flange rings 7.

Figure 5:
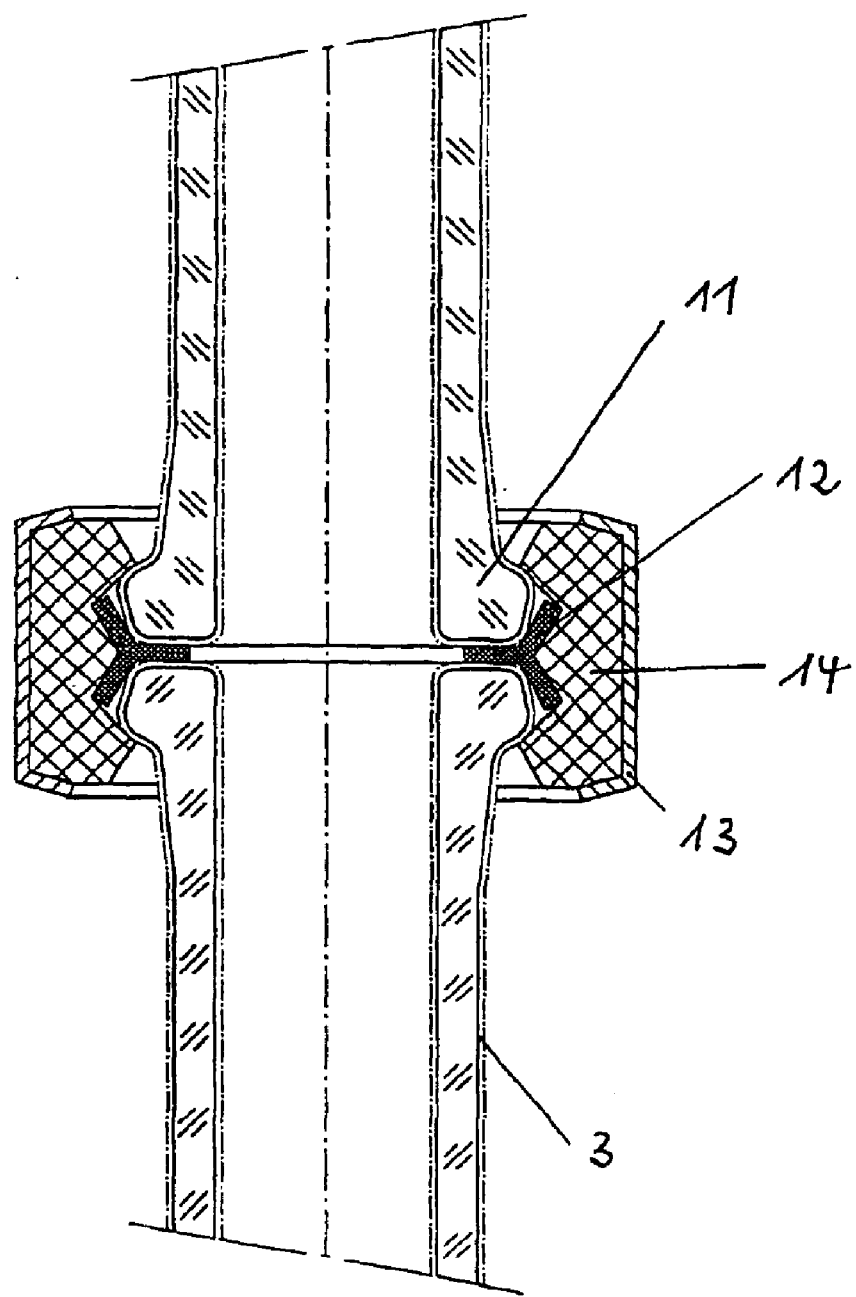
FIG. 5 an embodiment of an electrical conductive juncture between two glass modules with crimping flange.

In FIG. 5, the juncture of glass modules with crimping flange 11 is shown. Preferably, a conductive seal 12, preferably from conductive PTFE-graphite is utilized for establishing a conductive juncture. Preferably, also the elastomer 14 positioned under the stainless steel clamp 13 is made from a conductive material. The contact between the seal 12 and the glass surfaces is realized through tightening of the stainless steel clamp 13, thereby generating axial as well as radial forces which press the conductive seal 12 onto the front faces and the outer rim of the crimping flange having the electrically conductive coating 3, whereby the two glass modules are conductively joint to each other Thus, since the conductivity is a property of the surfaces of the glass modules per se, when utilizing the coated glass modules according to the invention for assembly of installations, equipment and pipe works, the safety measures that normally apply to glass modules with protective coating of non-conductive material are no longer necessary.

What is claimed is:

1. A glass module for the construction of equipment and installations and for pipe works, comprising one or more layers of a first coating material on one or more surfaces of the glass module in the form of a non-conducting coating of one of a polyurethane coating or glass fiber mats saturated with polyester resin, and one of more layers of a further coating of a second coating material deposited entirely or partially over the first coating to realize a reduction in surface resistance to thereby secure the module from electrostatic charges, wherein the second coating material is a transparent conductive organic polymer.

2. The glass module according to claim 1, wherein the second coating material is polyethylenedioxythiophene/polystyrenesulfonate.

3. An arrangement of coated glass modules according to claim 1, wherein one or more modules are joined to one another other via a conductive juncture.

4. The arrangement of glass modules according to claim 3, wherein the arrangement has one or more conductive junctures which are realized by flanges and conductive seals, and wherein the seals are selected from at least one of the group consisting of inserts, gaskets, collars, flange rings and bridges.

5. A method of utilizing glass modules which are costed according to claim 1, for the construction of glass equipment, glass installations and pipe works, comprising assembling the glass modules into an equipment or installation or pipe works by conductively joining each of the glass modules at a point of juncture.

6. The method according to claim 5, wherein the glass modules are provided with flanges for joining together and wherein at points of juncture conductive seals are provided in the form of at least one of intermediate layers, bridging or flange or clamp rings.

7. Glass equipment, glass installations and pipe works, which are constructed from glass modules coated according to claim 1, wherein each of the glass modules are conductively joined.

8. Glass equipment, glass installations and pipe works according to claim 7, wherein the glass modules are provided with flanges for juncture with one of each other or with other components and at the points of juncture are provided with conductive seals selected from at least one of the group consisting of conductive bridges and conductive flange rings or clamp rings.

9. An installation comprising one or more glass modules, wherein the glass modules are provided with one or more layers of a first coating material on one or more surfaces of the glass modules in the form of a non-conducting coating of one of a polyurethane coating or glass fiber mats saturated with polyester resin, and one or more layers of a further coating with a second coating material deposited entirely or partially over the first coating for reduction of surface resistance, wherein the second coating material is a transparent conductive organic polymer to thereby secure the module from electrostatic charges and wherein the modules are joined to each other via a conductive juncture.

10. The installation of claim 9, wherein the conductive juncture is realized through flanges and conductive seals, and wherein the seals are selected from at least one or more of the group consisting of inserts, gaskets, collars, flange rings and bridges.

11. A process of coating a glass module comprising the steps of depositing one or more layers of a coating of a first coating material on one or more surfaces of the glass module in the form of a non-conducting coating of one of a polyurethane costing or glass fiber mats saturated with polyester resin; depositing one or more layers of a further coating from a second coating material deposited entirely or partially over the first coating to thereby realize a reduction in surface resistance to thereby secure the module from electrostatic charges; and wherein the second coating material is a transparent conductive organic polymer.

* * * * *

UNITED STATES PATENT AND TRADEMARK OFFICE
CERTIFICATE OF CORRECTION

PATENT NO. : 6,905,141 B2
DATED : June 14, 2005
INVENTOR(S) : Karl-Heinz Winter & Klaus Gerth It is certified that error appears in the above-identified patent and that said Letters Patent is hereby corrected as shown below:

Title page,
Item [75], Inventors, replace "Klein-Winternhelm" with -- Klein-Winternheim --.

Column 5,
Line 31, replace "costed" with -- coated --.

Column 6,
Line 33, replace "costing" with -- coating --.

Signed and Sealed this

Eighteenth Day of October, 2005

JON W. DUDAS
*Director of the United States Patent and Trademark Office*